US012354561B2

(12) United States Patent
Jang et al.

(10) Patent No.: US 12,354,561 B2
(45) **Date of Patent: *Jul. 8, 2025**

(54) DISPLAY DEVICE AND METHOD OF OPERATING A DISPLAY DEVICE

(71) Applicant: SAMSUNG DISPLAY CO., LTD., Yongin-si (KR)

(72) Inventors: Wonwoo Jang, Seoul (KR); Seungho Park, Suwon-si (KR); Kyoungho Lim, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/313,837

(22) Filed: May 8, 2023

(65) Prior Publication Data

US 2023/0274706 A1 Aug. 31, 2023

Related U.S. Application Data

(63) Continuation of application No. 17/326,684, filed on May 21, 2021, now Pat. No. 11,676,543.

(30) Foreign Application Priority Data

Sep. 4, 2020 (KR) ........................ 10-2020-0113365

(51) Int. Cl.
*G09G 3/3275* (2016.01)

(52) U.S. Cl.
CPC ..... *G09G 3/3275* (2013.01); *G09G 2310/027* (2013.01); *G09G 2360/16* (2013.01)

(58) Field of Classification Search
CPC ............. G09G 3/3275; G09G 2360/16; G09G 2310/027; G09G 2320/0233;
(Continued)

(56) References Cited

U.S. PATENT DOCUMENTS 11,676,543 B2 * 6/2023 Jang ......................... G09G 5/10 345/690
2014/0146071 A1 5/2014 Kim et al.
(Continued)

FOREIGN PATENT DOCUMENTS

CN 103839509 A 6/2014
CN 110880298 A 3/2020
(Continued)

OTHER PUBLICATIONS

Office Action dated May 23, 2025 in related Chinese Patent Application No. 202110979131.9, 6 pages (in Chinese).

*Primary Examiner* — Nelson M Rosario
*Assistant Examiner* — Scott D Au
(74) *Attorney, Agent, or Firm* — F. CHAU & ASSOCIATES, LLC

(57) ABSTRACT

A display device includes a display panel, a controller, and a data driver. The display panel includes a plurality of pixels. The controller receives image data including data representing a logo, detects a logo region including the logo in the image data, determines a correction gain based on a quotient of a second gray level of a peripheral region adjacent to the logo region and a first gray level of the logo region, and generates corrected image data by correcting the image data based on the correction gain. The data driver provides data signals to the plurality of pixels based on the corrected image data.

20 Claims, 13 Drawing Sheets

(58) Field of Classification Search
CPC ... G09G 2310/0232; G09G 2320/0257; G09G 2320/041; G09G 2320/0686; G09G 2320/106; G09G 3/20; G09G 5/10; G09G 5/363
See application file for complete search history.

(56) References Cited

U.S. PATENT DOCUMENTS

| | | | | |
|---|---|---|---|---|
| 2016/0225344 | A1 | 8/2016 | Joo et al. | |
| 2019/0236746 | A1* | 8/2019 | Zhang | G06F 21/16 |
| 2020/0074708 | A1 | 3/2020 | Park | |
| 2022/0076635 | A1 | 3/2022 | Jang et al. | |

FOREIGN PATENT DOCUMENTS

| | | | | | |
|---|---|---|---|---|---|
| JP | 2020038339 | A | * | 3/2020 | G06T 7/90 |
| KR | 10-2016-0071885 | | | 6/2016 | |
| KR | 10-2016-0071886 | | | 6/2016 | |
| KR | 20160071886 | A | * | 6/2016 | H10K 59/00 |
| KR | 10-2016-0092537 | | | 8/2016 | |
| KR | 10-2016-0095673 | | | 8/2016 | |
| KR | 10-2017-0003213 | | | 1/2017 | |
| KR | 20170012836 | A | * | 2/2017 | H01L 27/3239 |
| KR | 10-1885824 | | | 7/2018 | |
| KR | 10-2020-0027617 | | | 3/2020 | |
| KR | 10-2111777 | | | 5/2020 | |

* cited by examiner

DISPLAY DEVICE AND METHOD OF OPERATING A DISPLAY DEVICE

CROSS-REFERENCE TO RELATED APPLICATION(S)

This application is a continuation of U.S. application Ser. No. 17/326,684 filed on May 21, 2021, which claims the benefit of Korean Patent Application No. 10-2020-0113365, filed on Sep. 4, 2020, in the Korean Intellectual Property Office, the disclosures of which are incorporated by reference herein in their entirety.

BACKGROUND

1. Field

One or more embodiments described herein relate to a display device and a method of operating the display device.

2. Description of the Related Art

As display devices operate over time, the pixels of the display device may become degraded. The degradation experienced by the pixels may severely degrade display quality, especially for pixels used to display a logo for an extended period of time. These effects are exacerbated when the logo includes a high gray level image. If prolonged, an afterimage may be displayed in the pixel region where the logo is displayed.

SUMMARY

One or more embodiments described herein provide a display device which may reduce degradation and afterimage effects, including but not exclusively in a logo region.

One or more embodiments described herein may reduce or prevent grayscale banding in a logo region and a peripheral region.

One or more embodiments described herein provide a method of operating a display device which may achieve the aforementioned effects.

In accordance with some embodiments, a display device includes a display panel including a plurality of pixels; a controller configured to detect a logo region including a logo in input image data, determine a correction gain based on a first average gray level of the logo region and a second average gray level of a peripheral region adjacent to the logo region, and generate corrected image data by correcting the input image data based on the correction gain; and a data driver configured to provide data signals to the plurality of pixels based on the corrected image data.

In accordance with some embodiments, a method of operating a display device includes detecting a logo region including a logo in input image data; determining a correction gain based on a first average gray level of the logo region and a second average gray level of a peripheral region adjacent to the logo region; generating corrected image data by correcting the input image data based on the correction gain; and driving a display panel based on the corrected image data.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
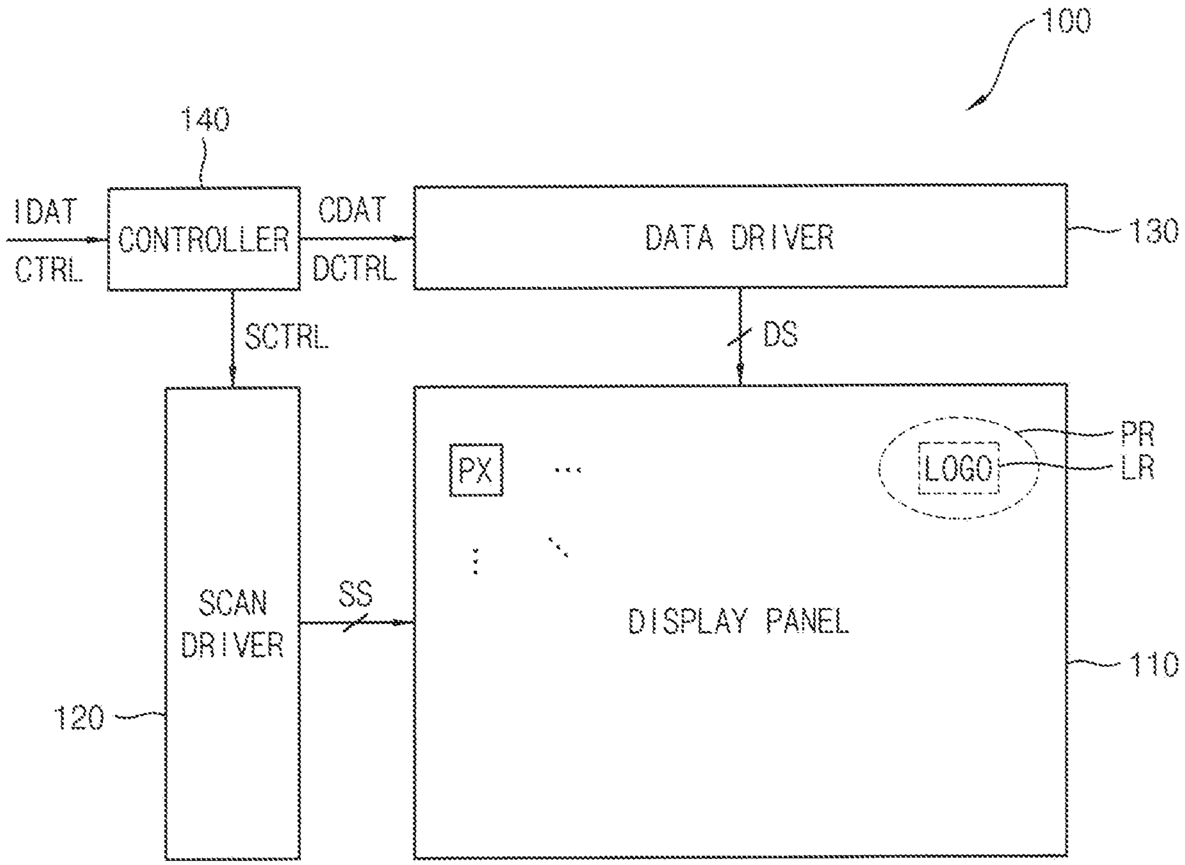
FIG. 1 illustrates an embodiment of a display device.
Figure 2:
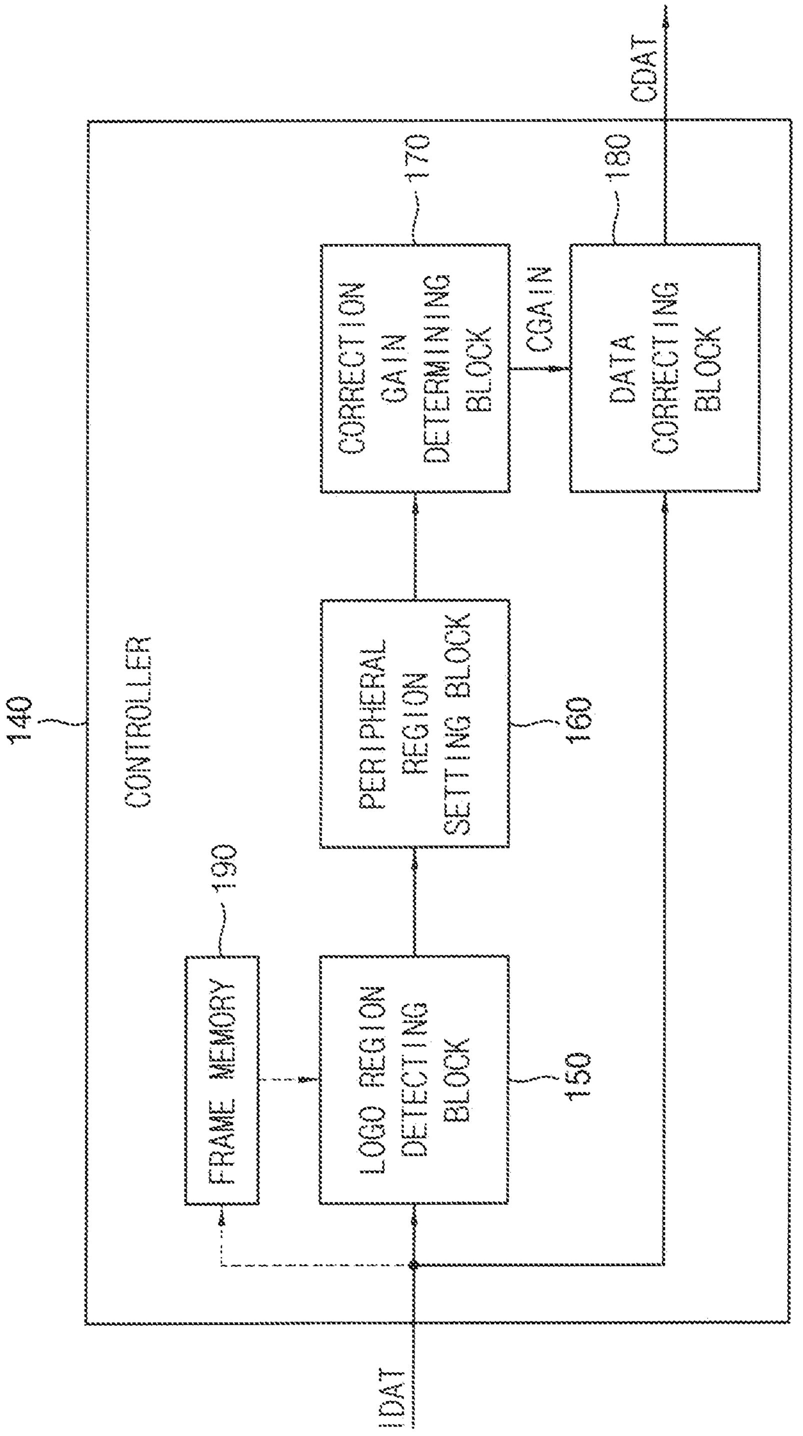
FIG. 2 illustrates an embodiment of a controller of a display device.
Figure 3:
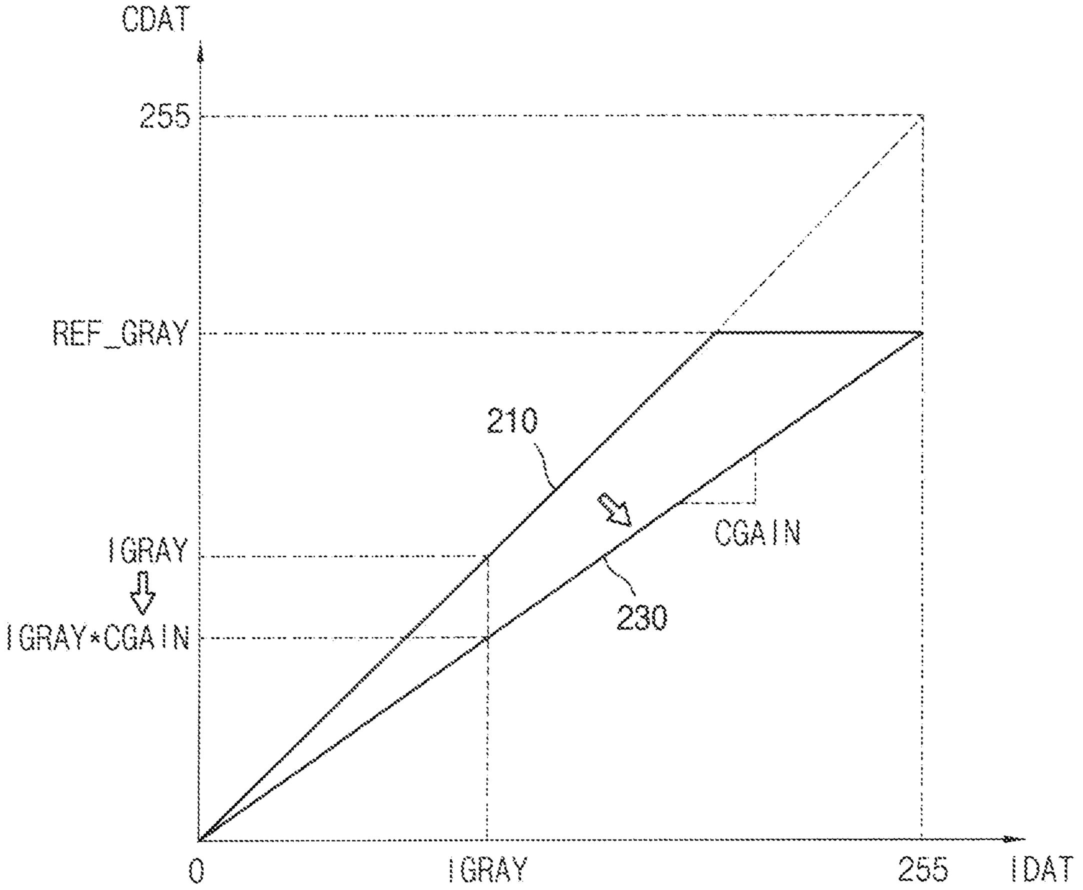
FIG. 3 illustrates examples of generating corrected image data.

FIG. 1 is a block diagram illustrating an embodiment of a display device 100. FIG. 2 illustrates an embodiment of a controller 140 of a display device. FIG. 3 illustrates an example where corrected image data are generated by correcting input image data based on a correction gain in a display device.

Referring to FIG. 1, according to embodiments the display device 100 may include a display panel 110, a scan driver 120, a data driver 130, and a controller 140. The display panel 110 may include a plurality of pixels PX. The scan driver 120 may provide scan signals SS to the plurality of pixels PX. The data driver 130 may provide data signals DS to the plurality of pixels PX. The controller 140 may control the scan driver 120 and the driver 130.

The display panel 110 may include a plurality of data lines, a plurality of scan lines, and the plurality of pixels PX coupled to the plurality of data lines and the plurality of scan lines. Each pixel PX may include, for example, a self-luminous light emitter, e.g., an organic light emitting diode (OLED). In this case, the display panel 110 may be an OLED panel. In other embodiments, the display panel 110 may be an inorganic light emitting diode display panel, a quantum dot light emitting diode display panel, a liquid crystal display (LCD) panel, or any other suitable display panel.

The scan driver 120 may provide the scan signals SS to the plurality of pixels PX based on a scan control signal SCTRL from the controller 140. In some embodiments, the scan control signal SCTRL may include, but is not limited to, a scan start signal and a scan clock signal. In some embodiments, the scan driver 120 may be integrated or formed in a peripheral portion of the display panel 110. In some embodiments, the scan driver 120 may be implemented with one or more integrated circuits.

The data driver 130 may provide data signals DS to the plurality of pixels PX, through the plurality of data lines, based on a data control signal DCTRL and corrected image data CDAT from the controller 140. In some embodiments, the data control signal DCTRL may include, but is not limited to, an output data enable signal, a horizontal start signal and a load signal. In some embodiments, the data driver 130 and the controller 140 may be implemented with a single integrated circuit, which, for example, may be referred to as a timing controller embedded data driver (TED). In other embodiments, the data driver 130 and the controller 140 may be implemented with separate integrated circuits.

The controller 140 (e.g., a timing controller (TCON)) may receive input image data IDAT and a control signal CTRL from an external host processor (e.g., a graphic processing unit (GPU), an application processor (AP) or a graphic card). In some embodiments, the input image data IDAT may be RGB image data including red image data, green image data and blue image data. In other embodiments, the input image data IDAT may be image data of a different combination of colors.

In some embodiments, the control signal CTRL may include, but is not limited to, a vertical synchronization signal, a horizontal synchronization signal, an input data enable signal, a master clock signal, and/or one or more other types of signals. The controller 140 may generate the scan control signal SCTRL, data control signal DCTRL and corrected image data CDAT based on the control signal CTRL and the input image data IDAT. The controller 140 may control an operation of the scan driver 120 by providing the scan control signal SCTRL to the scan driver 120, and may control operation of the data driver 130 by providing the data control signal DCTRL and corrected image data CDAT to data driver 130.

In the display device 100 according to embodiments, the controller 140 may receive the input image data IDAT, detect a logo region LR including a logo by analyzing the input image data IDAT, and determine a correction gain based on a first average gray level of the logo region LR and a second average gray level of a peripheral region PR adjacent to the logo region LR. In addition the controller 140 may generate the corrected image data CDAT by correcting the input image data IDAT based on the correction gain.

In some embodiments, the controller 140 may calculate the correction gain by dividing the second average gray level of the peripheral region PR by the first average gray level of the logo region LR, and may generate the corrected image data CDAT by multiplying (e.g., calculating the product of) the input image data IDAT for the logo region LR and/or the peripheral region PR by (and) the correction gain, In some embodiments, a gray level of the corrected image data CDAT for the logo region LR and/or the peripheral region PR may be linearly proportional to a gray level of the input image data IDAT for the logo region LR and/or the peripheral region PR. In some embodiments, the gray level of the corrected image data CDAT for the logo region LR and/or the peripheral region PR may be adjusted (e.g., decreased otherwise adjusted), for example, relative to the gray level of the input image data IDAT for the logo region LR and/or the peripheral region PR.

The data driver 130 may provide the plurality of pixels PX in the logo region LR and/or the peripheral region PR with the data signals DS corresponding to the corrected image data CDAT, which corrected image data CDAT corresponds to gray levels that have been adjusted (e.g., decreased) relative to the input image data IDAT. If not adjusted (e.g., if the data signals DS corresponding to the input image data IDAT are provided to the plurality of pixels PX in the logo region LR), degradation of the pixels PX in the logo region LR and/or the peripheral region PR may occur, along with an afterimage effect in that/those regions(s). However, according to one or more embodiments, the adjusted data signals DS corresponding to the corrected image data CDAT may reduce degradation of the pixels in the logo region LR and/or peripheral region PR and may prevent an afterimage effect from occurring in the logo region LR and/or the peripheral region PR.

To perform these operations, as illustrated, for example, in FIG. 2, the controller 140 according to embodiments may include a logo region detecting block 150, a peripheral region setting block 160, a correction gain determining block 170, and a data correcting block 180. These blocks may correspond to logic implemented in software, hardware, or a combination both. In some embodiments, the controller 140 may further include a frame memory 190 inside or coupled to the controller 140 or external and coupled to the controller 140.

The logo region detecting block (e.g., detector) 150 may detect the logo region LR including the logo (e.g., "LOGO" in FIG. 1). In some cases, the LOGO region LR may include a different or predetermined type of (e.g., high) gray level image compared with other portions of images and/or the peripheral region PR displayed on the display panel 110. In some cases, the LOGO region LR may be a still image displayed on a continual basis or for an extended period of time. In some cases, an image represented by the input image data IDAT may have one or more edges corresponding to the LOGO region LR. In some embodiments, the logo region detecting block 150 may detect the LOGO region LR based on one or more of the foregoing attributes, e.g., may detect the LOGO region LR based on detection of a high gray region, a still region, and/or an edge region in the image represented by the input image data IDAT. In one or more embodiments, the logo region detecting block 150 may detect the LOGO region LR as an overlap of two or more of a high gray level region, a still region, or an edge region. In accordance with one or more embodiments described herein, the high gray level region may be a region with gray level pixel values above a predetermined level. However, these are only examples and the logo region detecting block 150 may detect the logo region LR using a different method in another embodiment.

The peripheral region setting block (e.g., setting logic) 160 may set the peripheral region PR adjacent to the logo region LR. For example, the peripheral region setting block 160 may set a region surrounding the logo region LR. The surrounding peripheral region PR may have a predetermined shape, e.g., a substantially rectangular shape, elliptical shape or another shape. In some embodiments, the peripheral region setting block 160 may store one or more parameters corresponding to a size and/or a shape of the peripheral region PR, and may set the peripheral region PR based on the one or more parameters. In some embodiments, the one or more parameters corresponding to the size and/or shape of the peripheral region PR may be selected, set or changed by the host processor or by a user.

The correction gain determining block (e.g., gain logic) 170 may determine the correction gain CGAIN based on the first average gray level of the logo region LR and the second average gray level of the peripheral region PR. In some embodiments, the correction gain determining block 170 may calculate the first average gray level of the logo region LR by calculating an average of gray levels of the input image data IDAT for the logo region LR, may calculate the second average gray level of the peripheral region PR by calculating an average of gray levels of the input image data IDAT for the peripheral region PR, and may calculate a luminance ratio (of a luminance of the peripheral region PR to a luminance of the logo region LR) by dividing the second average gray level by the first average gray level.

In addition, the correction gain determining block 170 may determine the correction gain CGAIN based on the luminance ratio and a predetermined or preset (e.g., minimum) correction gain. In this case, the correction gain CGAIN may be determined to be greater than or equal to the predetermined or present (e.g., minimum) correction gain and less than or equal to 1. In one embodiment, the predetermined or preset correction gain may be different from a minimum gain.

In some embodiments, because a region having a luminance higher than that of the peripheral region PR may be detected as the logo region LR, the luminance ratio of the luminance of the peripheral region PR to the luminance of the logo region LR may be less than or equal to 1. In some cases, even if the luminance ratio is greater than 1, the correction gain determining block 170 may determine the correction gain CGAIN as 1.

For example, the correction gain determining block 170 may calculate the luminance ratio of the luminance of the peripheral region PR to the luminance of the logo region LR based on equation (1):

$$LUM\_RATIO=AVG\_PERI/AVG\_LOGO \quad (1)$$

where LUM_RATIO may represent the luminance ratio, AVG_PERI may represent the second average gray level of the peripheral region PR, and AVG_LOGO may represent the first average gray level of the logo region LR.

In addition, the correction gain determining block 170 may calculate correction gain CGAIN based on equation (2):

$$CGAIN=LUM\_RATIO*(1-GAIN\_LIMIT)+GAIN\_LIMIT" \quad (2)$$

where CGAIN represents the correction gain CGAIN and GAIN_LIMIT may represent the predetermined or preset (e.g., minimum) correction gain. Hereinafter, the predetermined or preset correction gain will be assumed to be a minimum correction gain for the sake of discussion. The predetermined correction gain may be a value different from a minimum correction gain in another embodiment.

In view of equations (1) and (2), it is seen that as the second average gray level of the peripheral region PR decreases or as the first average gray level of the logo region LR increases, the correction gain CGAIN may be reduced from 1. The corrected image data CDAT may be generated based on the correction gain CGAIN and thus may be different from (e.g., reduced in gray level compared with) the input image data IDAT. Accordingly, degradation of the pixels PX in the logo region LR may be reduced, which, in turn, may reduce an afterimage effect that may be prone to develop in the logo region LR.

In some embodiments, the correction gain determining block 170 may calculate the first average gray level of the logo region LR and divide the peripheral region PR into a plurality of peripheral sub-regions (e.g., having a predetermined (e.g., ring) shape surrounding the logo region LR). In addition, the correction gain determining block 170 calculate the second average gray level of the peripheral region PR to correspond to a weighted-average gray level of one or more peripheral sub-regions. One or more weights used to calculate weighted-average gray level may change (e.g., decrease) as distances of the one or more peripheral sub-regions to the logo region LR increase.

In addition, the correction gain determining block 170 may calculate a luminance ratio, which may correspond to a weighted-luminance of the peripheral region PR to a luminance of the logo region LR. This calculation may include, for example, dividing (calculating the quotient of) the weighted-average gray level by (and) the first average gray level. The correction gain determining block 170 may determine the correction gain CGAIN, based on the luminance ratio and the minimum correction gain, to be a value greater than or equal to the minimum correction gain and less than or equal to 1. In some embodiments, a relatively high weight may be applied to one or more of the peripheral sub-regions closer to the logo region LR, a relatively low weight may be applied to one or more of the peripheral sub-regions farther away from the logo region LR. Accordingly, in one or more embodiments, the correction gain CGAIN may have a more pronounced effect on a peripheral image closer to the logo.

The data correcting block (e.g., data corrector) 180 may generate the corrected image data CDAT, for example, by correcting the input image data IDAT for the logo region LR and the peripheral region PR based on the correction gain CGAIN. In some embodiments, the data correcting block 180 may generate the corrected image data CDAT by multiplying the input image data IDAT for the logo region LR and the peripheral region PR by the correction gain CGAIN. Since the correction gain CGAIN is less than or equal to 1, the corrected image data CDAT for the logo region LR and the peripheral region PR may be decreased compared with the input image data IDAT for the logo region LR and the peripheral region PR. Accordingly, degradation of pixels PX in the logo region LR may be reduced, which, in turn, may reduce the likelihood of an afterimage effect occurring in the logo region LR.

In other embodiments, the data correcting block 180 may generate the corrected image data CDAT for the logo region LR by multiplying the input image data IDAT for the logo region LR by the correction gain. Further, to generate the corrected image data CDAT for the peripheral region PR, the data correcting block 180 may divide the peripheral region PR into a plurality of peripheral sub-regions (e.g., having a predetermined (e.g., ring) shape surrounding the logo region LR) and may determine a plurality of sub-region correction gains for the plurality of peripheral sub-regions. The plurality of sub-region correction gains may be, for example, greater than the correction gain CGAIN and less than 1.

The data correcting block 180 may multiply the input image data IDAT for the plurality of peripheral sub-regions by the plurality of sub-region correction gains, respectively. For example, the data correcting block 180 may determine the plurality of sub-region correction gains for peripheral sub-regions, so that the sub-region correction gains for the peripheral sub-regions are linearly proportional to distances of the peripheral sub-regions relative to the logo region LR. Thus, for example, the sub-region correction gain for one or more peripheral sub-regions closer to the logo region LR may be closer to the correction gain CGAIN, and the sub-region correction gain(s) for one or more peripheral sub-region(s) farther away from the logo region LR may be close to 1.

In this case, the amount of decrease of the corrected image data CDAT relative to the input image data IDAT corresponding to the peripheral sub-region(s) farther away from the logo region LR may be less than the amount of decrease of the corrected image data CDAT relative to the input image data IDAT corresponding to peripheral sub-region(s) closer to the logo region LR. Thus, the luminance difference between the peripheral region PR and a region outside (or surrounding) the peripheral region PR may be reduced.

In some embodiments, the correction gain CGAIN may be determined based on the input image data IDAT in a previous frame period. The corrected image data CDAT in a current frame period may then be generated by correcting the input image data IDAT in the current frame period based on the correction gain CGAIN in the previous frame period. For example, the input image data IDAT in the previous frame period may be stored in the frame memory 190, and the correction gain CGAIN may be determined based on the input image data IDAT stored in the frame memory 190. In some embodiments, the correction gain CGAIN may be determined based on the input image data IDAT in the current frame period, and the corrected image data CDAT in the current frame period may be generated by correcting the input image data IDAT in the current frame period based on the correction gain CGAIN in the current frame period.

In some display devices which have been proposed (e.g., organic light emitting diode (OLED) display devices), performance of pixels PX may degrade over time. For example, pixels PX displaying a logo that includes a high gray level image may be degraded more severely than pixels PX in other areas of the display device. Accordingly, an afterimage effect may be displayed in the logo region LR where the logo is displayed.

In an attempt to reduce degradation and the occurrence of an afterimage in the logo region, the proposed display devices perform a clamping operation that limits gray levels for the logo and peripheral regions to a predetermined reference gray level. For example, as illustrated by the curve 210 in FIG. 3, with respect to the logo and peripheral regions, proposed display devices convert gray levels greater than a reference gray level REF_GRAY in input image data IDAT to a reference gray level REF_GRAY in corrected image data CDAT. The corrected image data CDAT (with gray levels less than or equal to the reference gray level REF_GRAY) is then used to drive the display in the logo region. Because gray levels greater than the reference gray level REF_GRAY are converted to the same reference gray level REF_GRAY in the logo and peripheral regions, a grayscale banding phenomenon may occur where an edge of an image (e.g., logo) is not perceived in the logo region and peripheral region.

However, in the display device 100 according to embodiments, no such conversion is performed. As illustrated as a graph 230 in FIG. 3, gray levels of the corrected image data CDAT may be proportional (e.g., linearly proportional) to gray levels of the input image data IDAT. For example, with respect to the full range of gray levels (e.g., 0-gray level to a 255-gray level) of the input image data IDAT, the display device 100 according to embodiments may convert any input gray level IGRAY of the input image data IDAT to a gray level IGRAY*CGAIN, where the input gray level IGRAY is multiplied by the correction gain CGAIN. Corrected image data CDAT representing the converted gray level IGRAY*CGAIN may therefore be generated. Accordingly, since the gray level IGRAY*CGAIN of the corrected image data CDAT for logo region LR and the peripheral region PR may be reduced compared with the input gray level IGRAY of the input image data IDAT for the logo region LR and the peripheral region PR, degradation of the pixels PX in the logo region LR may be reduced, which, in turn, may reduce an afterimage effect in the logo region LR. Further, in the display device 100 according to embodiments, since the gray level IGRAY*CGAIN of the corrected image data CDAT is proportional (e.g., linearly proportional) to the input gray level IGRAY of the input image data IDAT, a grayscale banding phenomenon may be prevented. In some embodiments, the gray level IGRAY*CGAIN of the corrected image data CDAT may be non-linearly proportional to the input gray level IGRAY of the input image data IDAT, providing, for example, the clamping operation of the proposed display devices is not performed.

Figure 4:
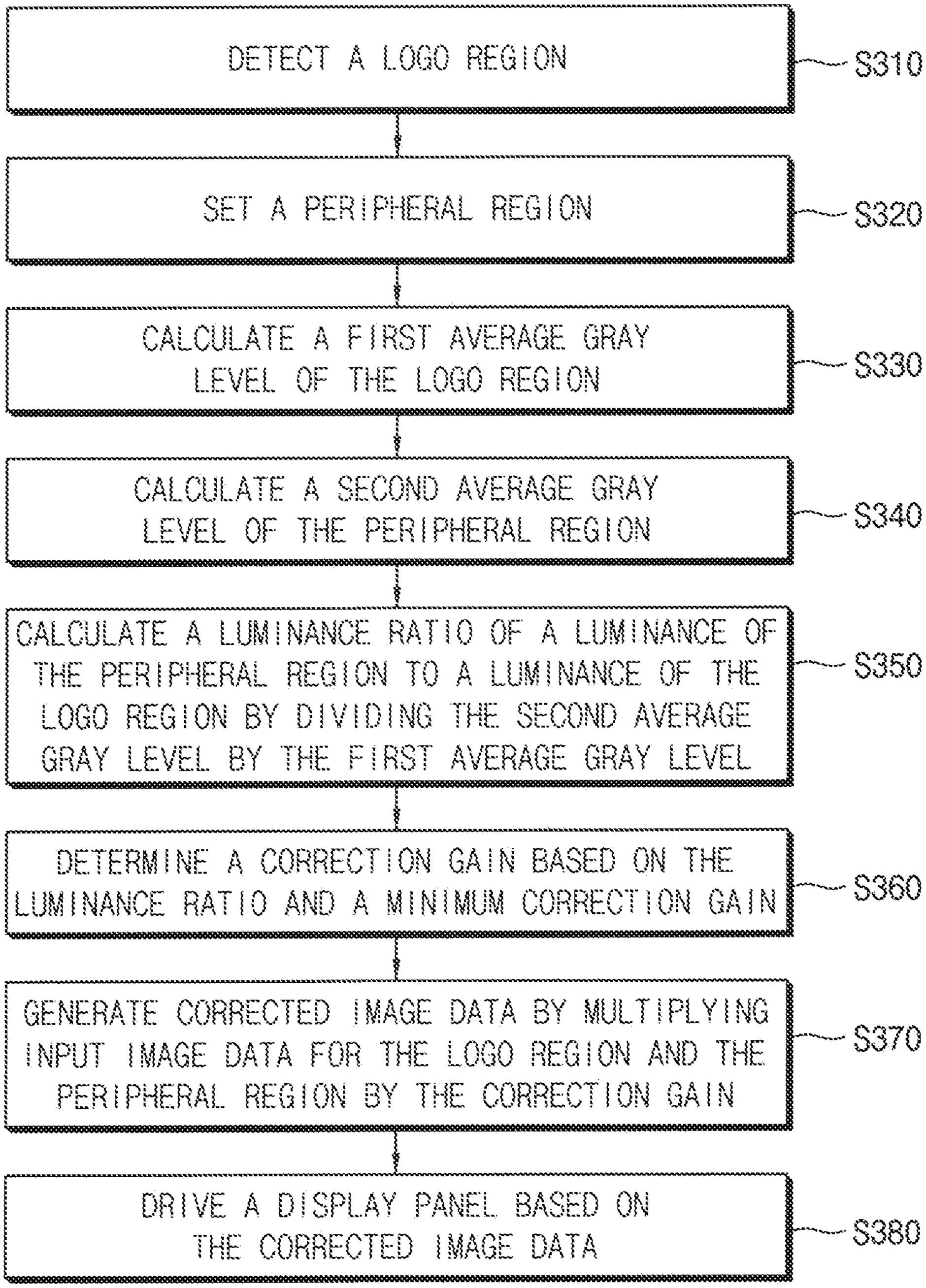
FIG. 4 illustrates an embodiment of a method of operating a display device.
Figure 5A:
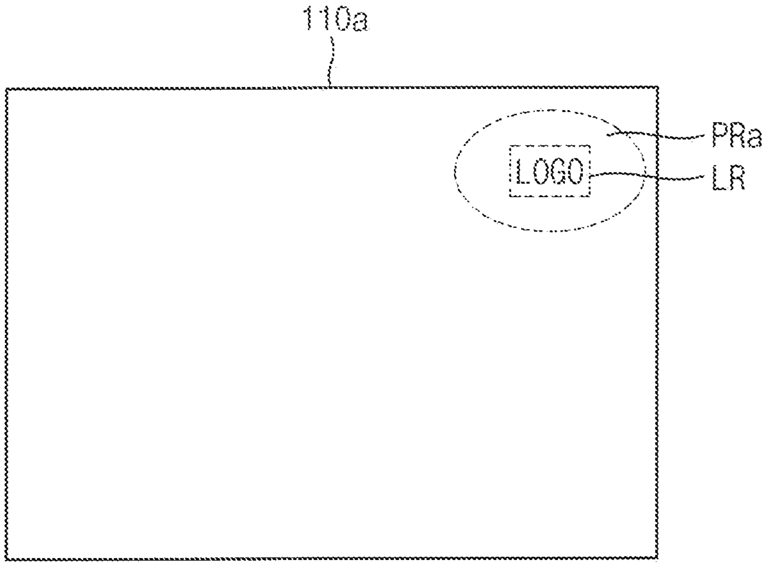
FIGS. 5A and 5B illustrate examples of a peripheral region adjacent to a logo region.
Figure 5B:
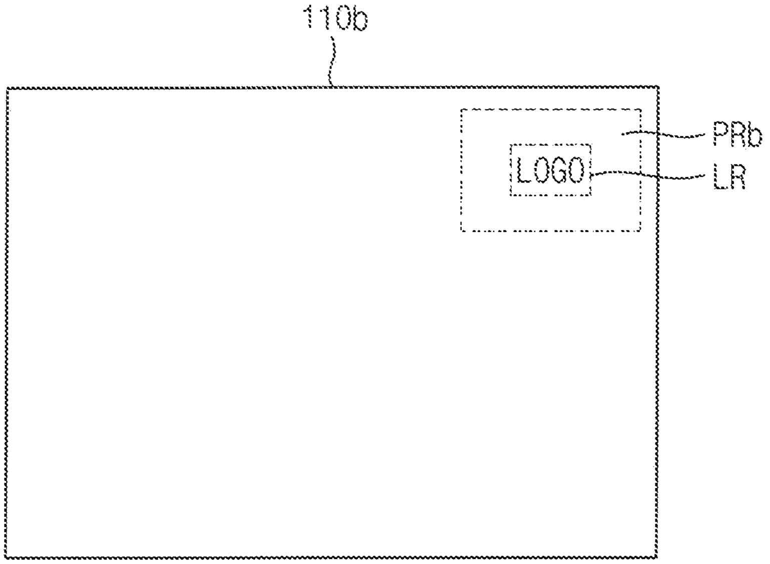
Figure 6:
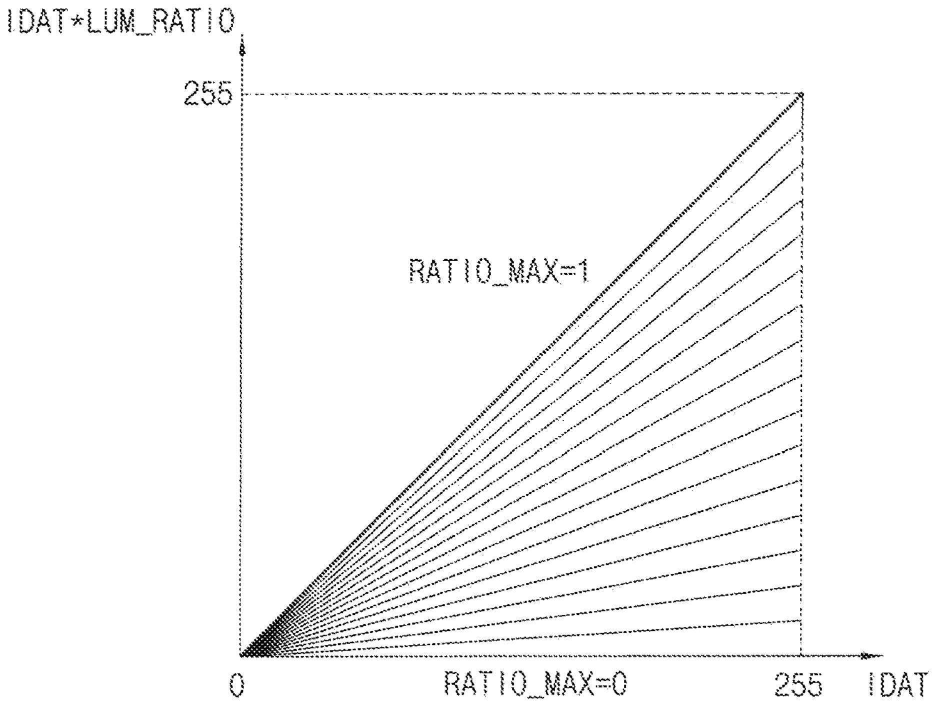
FIG. 6 illustrates examples of peripheral region to logo region luminance ratios.
Figure 7:
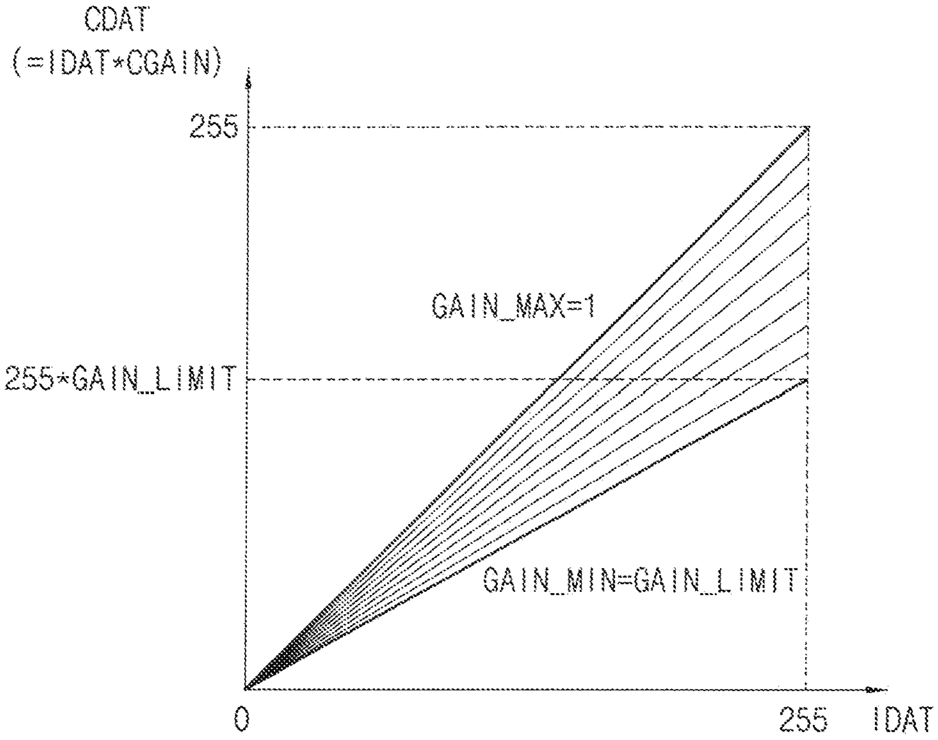
FIG. 7 illustrates an example of a correction gain determined based on a luminance ratio and a predetermined correction gain.

FIG. 4 is a flowchart illustrating an embodiment of a method of operating a display device. FIG. 5A is a diagram for describing an example of a peripheral region adjacent to a logo region. FIG. 5B is a diagram for describing another example of a peripheral region adjacent to a logo region. FIG. 6 is a diagram for describing an example of a luminance ratio of a luminance of a peripheral region to a luminance of a logo region. FIG. 7 is a diagram for describing an example of a correction gain determined based on a luminance ratio and a minimum correction gain.

Referring to FIGS. 1, 2 and 4, the method includes, at S310, logo region detecting block 150 detecting a logo region LR including a logo based on an analysis of input image data IDAT. In some embodiments, the logo region detecting block 150 may detect a high gray level region (e.g., higher than a predetermined level), a still region, and/or an edge region in an image represented by the input image data IDAT. In some embodiments, the logo region detecting block 150 may detect as the logo region LR a region where two or more of the high gray region, the still region or the edge region overlap.

At S320, peripheral region setting block 160 may set a peripheral region PR adjacent to the logo region LR. In an example, as illustrated in FIG. 5A, the logo region detecting block 150 may detect the logo region LR including a logo in an image displayed in a display panel 110*a*. The peripheral region setting block 160 may then set a peripheral region PRa having a predetermined (e.g., elliptical) shape surrounding the logo region LR. In one example, as illustrated in FIG. 5B, the logo region detecting block 150 may detect the logo region LR including a logo in an image displayed in a display panel 110*b*. The peripheral region setting block 160 may then set a peripheral region PRa having a predetermined (e.g., substantially rectangular) shape surrounding the logo region LR. In some embodiments, the size and/or shape of peripheral region PR may be selected, set or changed by a host processor or user.

At S330, correction gain determining block 170 may calculate a first average gray level of the logo region LR. The correction gain determining block 170 may calculate the first average gray level of the logo region LR, for example, by calculating an average of gray levels of the input image data IDAT for the logo region LR.

At 340, correction gain determining block 170 may calculate a second average gray level of the peripheral region PR. For example, the correction gain determining block 170 may calculate the second average gray level of the peripheral region PR by calculating an average of gray levels of the input image data IDAT for the peripheral region PR.

At S350, correction gain determining block 170 may calculate a luminance ratio (of a luminance of the peripheral region PR to a luminance of the logo region LR) by dividing the second average gray level of the peripheral region PR by the first average gray level of the logo region LR. For example, the correction gain determining block 170 may calculate the luminance ratio of the luminance of the peripheral region PR to the luminance of the logo region LR using equation: LUM_RATIO=AVG_PERI/AVG_LOGO, where LUM_RATIO may represent the luminance ratio, AVG_PERI may represent the second average gray level of the peripheral region PR, and AVG_LOGO may represent the first average gray level of the logo region LR.

Because a region having a luminance higher than that of the peripheral region PR may be detected as the logo region LR, the luminance ratio (of the luminance of the peripheral region PR to the luminance of the logo region LR) may be less than or equal to 1. Further, even if the second average gray level of the peripheral region PR is higher than the first average gray level of the logo region LR, the correction gain determining block 170 may determine a correction gain CGAIN as 1.

Accordingly, as illustrated in FIG. 6, the luminance ratio LUM_RATIO may have a value greater than or equal to a minimum ratio RATIO_MIN of about 0 and a maximum ratio RATIO_MAX of about 1. In a case where the value of the luminance ratio LUM_RATIO having the minimum ratio RATIO_MIN of about 0 is determined as the correction gain CGAIN, an image may be distorted or obscured since all of corrected image data CDAT for the logo region LR and the peripheral region PR have a 0-gray level. To prevent this distortion, the correction gain determining block 170 may determine the correction gain CGAIN to be greater than or equal to a (predetermined or preset) minimum correction gain.

As S360, the correction gain determining block 170 may determine the correction gain CGAIN based on the luminance ratio LUM_RATIO and the minimum correction gain. In this case, the correction gain CGAIN may be determined to be greater than or equal to the minimum correction gain and less than or equal to 1. In some embodiments, the correction gain determining block 170 may calculate the correction gain CGAIN using the following equation: CGAIN=LUM_RATIO*(1−GAIN_LIMIT)+GAIN_LIMIT, where CGAIN may represent the correction gain CGAIN, LUM_RATIO may represent the luminance ratio, and GAIN_LIMIT may represent the minimum correction gain. Accordingly, as illustrated in FIG. 7, the correction gain CGAIN may have a value greater than or equal to a minimum gain GAIN_MIN, and may be based on or may be between the minimum correction gain GAIN_LIMIT and a maximum gain GAIN_MAX of about 1, inclusive.

At S370, data correcting block 180 may generate the corrected image data CDAT by multiplying the input image data IDAT for the logo region LR and the peripheral region PR by the correction gain CGAIN. In the example of FIG. 7, in a case where the correction gain CGAIN is determined as the minimum correction gain GAIN_LIMIT, the input image data IDAT representing a 0-gray level to a 255-gray level may be converted to the corrected image data CDAT representing the 0-gray level to a 255-gray level 255*GAIN_ LIMIT multiplied by the minimum correction gain GAIN_LIMIT. Also, gray levels (e.g., 0 to 255*GAIN_ LIMIT) of the corrected image data CDAT may be proportional (e.g., linearly proportional) to gray levels (e.g., 0 to 255) of the input image data IDAT.

At S380, data driver 130 may drive a display panel 110 based on the corrected image data CDAT. With respect to the logo region LR and the peripheral region PR, since the gray level of the corrected image data CDAT is reduced compared with the gray level of the input image data IDAT, degradation of pixels PX in the logo region LR may be reduced, which, in turn, may reduce an afterimage effect in the logo region LR. Further, since the gray level of the corrected image data CDAT is proportional (e.g., linearly proportional) to the gray level of the input image data IDAT, a grayscale banding phenomenon may be prevented.

Figure 8:
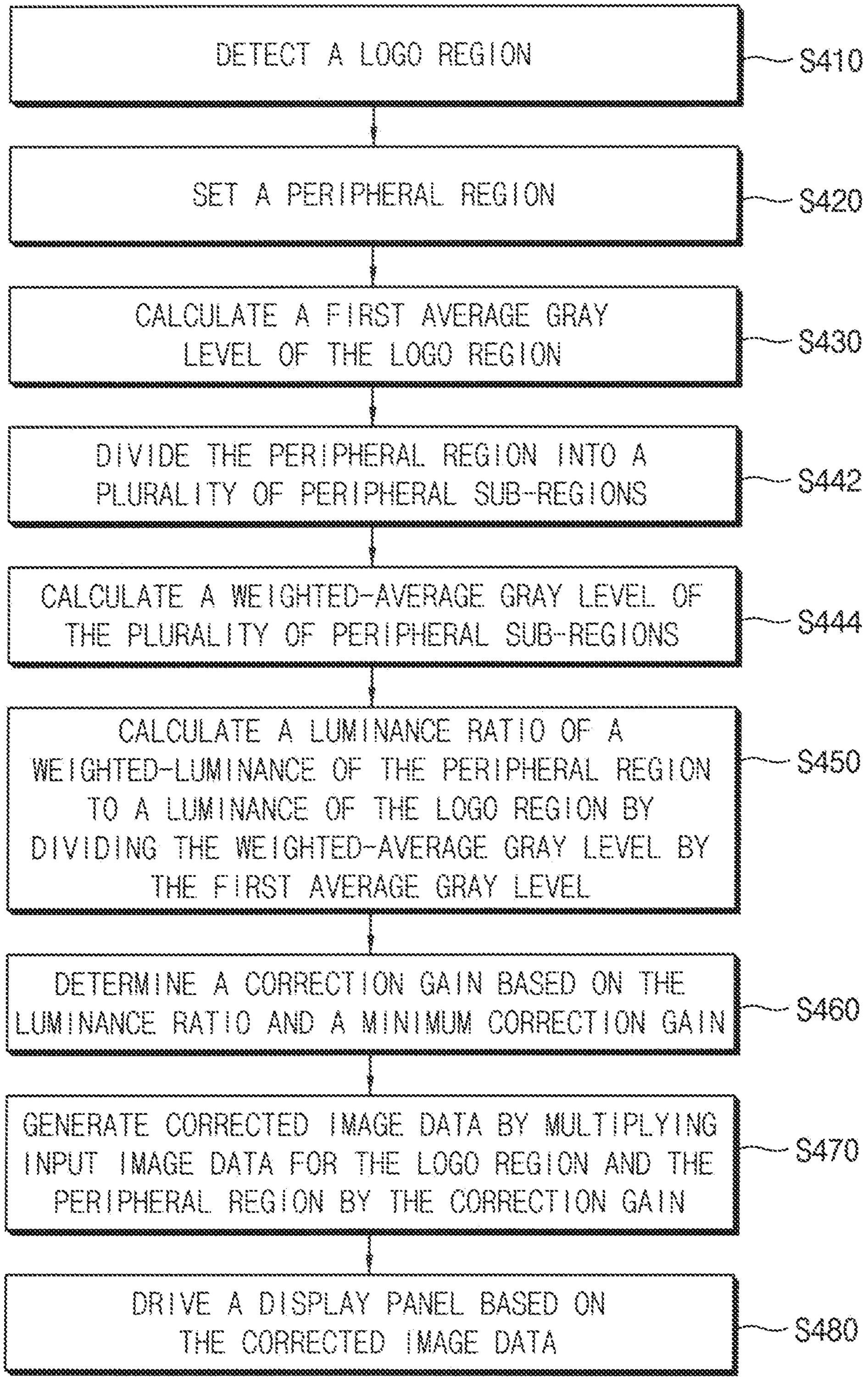
FIG. 8 illustrates an embodiment of a method of operating a display device.
Figure 9:
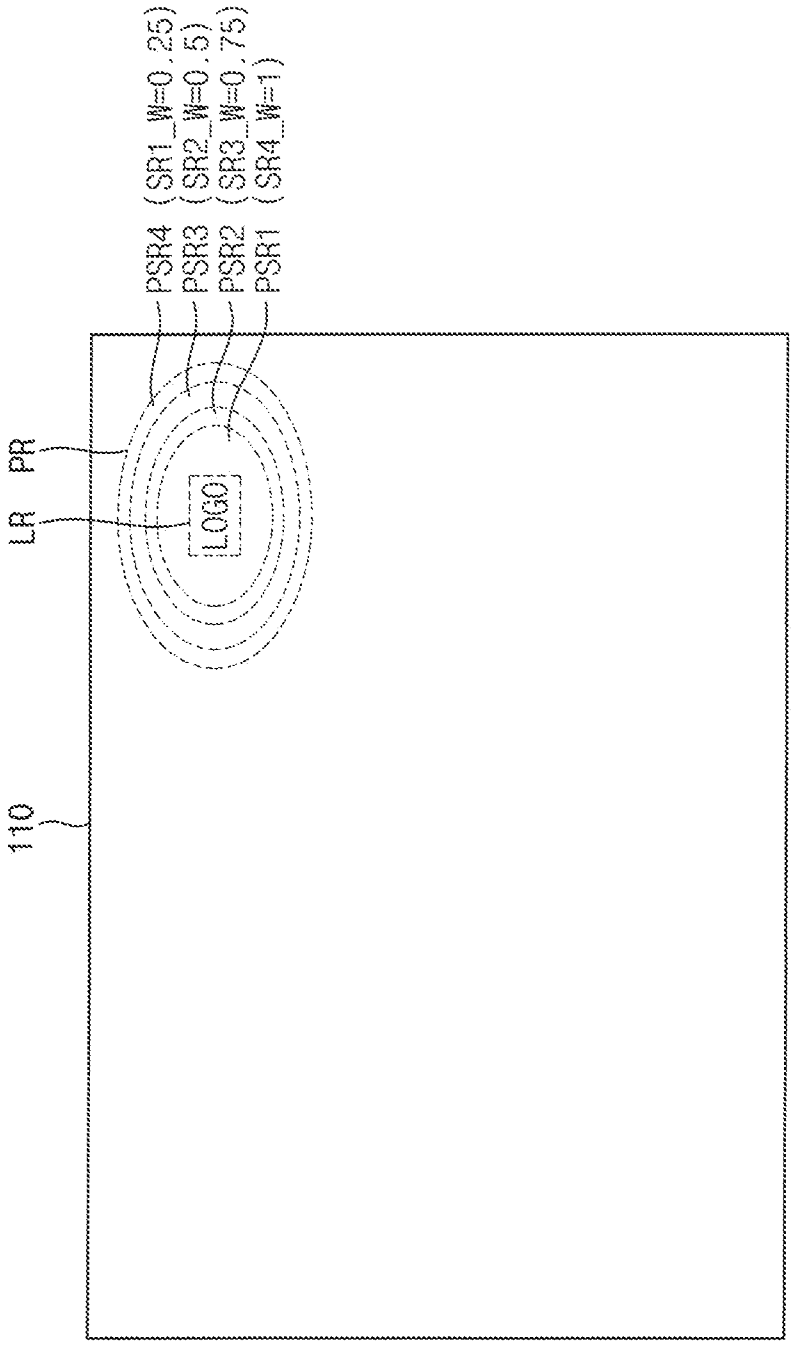
FIG. 9 illustrates an example of sub-region weights for peripheral sub-regions.

FIG. 8 is a flowchart illustrating an embodiment of a method of operating a display device. FIG. 9 is a diagram for describing an example of a plurality of peripheral sub-regions (into which a peripheral region may be divided) and a plurality of sub-region weights for the plurality of peripheral sub-regions. The method of FIG. 8 may be similar to a method of FIG. 4, except that a second average gray level of the peripheral region may be determined as a weighted-average gray level of a plurality of peripheral sub-regions.

Referring to FIGS. 1, 2 and 8, at S410, logo region detecting block 150 may detect a logo region LR including a logo based on an analysis of input image data IDAT (S410).

At S420, peripheral region setting block 160 may set a peripheral region PR adjacent to the logo region LR.

At S430, correction gain determining block 170 may calculate a first average gray level of the logo region LR.

At S442, correction gain determining block 170 may divide the peripheral region PR into a plurality of peripheral sub-regions. For example, as illustrated in FIG. 9, the correction gain determining block 170 may divide the peripheral region PR having a predetermined (e.g., elliptical) shape into a plurality of peripheral sub-regions PSR1, PSR2, PSR3 and PSR4, each of which may have a predetermined (e.g., ring shape) surrounding the logo region LR. In the example of FIG. 9, the plurality of peripheral sub-regions PSR1, PSR2, PSR3 and PSR4 may include, but is not limited to, a first peripheral sub-region PSR1 close to the logo region LR, a second peripheral sub-region PSR2 farther away from the logo region LR compared with the first peripheral sub-region PSR1, a third peripheral sub-region PSR3 farther away from the logo region LR compared with the second peripheral sub-region PSR2, and a fourth peripheral sub-region PSR4 that is farthest away from the logo region LR.

At S444, correction gain determining block 170 may calculate a weighted-average gray level of the plurality of peripheral sub-regions PSR1, PSR2, PSR3 and PSR4, based on one or more weights that decrease with increasing distance away from the logo region LR. For example, as illustrated in FIG. 9, the correction gain determining block 170 may calculate the weighted-average gray level by applying a first weight SR1_W of about 1 to an average gray level of the first peripheral sub-region PSR1, a second weight SR2_W of about 0.75 to an average gray level of the second peripheral sub-region PSR2, a third weight SR3_W of about 0.5 to an average gray level of the third peripheral sub-region PSR3, and a fourth weight SR4_W of about 0.25 to an average gray level of fourth peripheral sub-region PSR4.

At S450, correction gain determining block 170 may calculate a luminance ratio (of a weighted-luminance of the peripheral region PR to a luminance of the logo region LR) by dividing the weighted-average gray level of the plurality of peripheral sub-regions PSR1, PSR2, PSR3 and PSR4, or the weighted-average gray level of the peripheral region PR by the first average gray level of the logo region LR.

At S460, correction gain determining block 170 may determine a correction gain CGAIN to be greater than or equal to the minimum correction gain and less than or equal to 1. The correction gain determining block 170 may determine the correction gain CGAIN in this range based on the luminance ratio and a minimum correction gain. Since a relatively high weight SR1_W may be applied to the first peripheral sub-region PSR1 (which is close to the logo region LR) and a relatively low weight SR4_W may be applied to the fourth peripheral sub-region PSR4 (which is farther away from the logo region LR), the correction gain CGAIN may have a more profound effect on a peripheral image at areas closer to the logo.

At S470, data correcting block 180 may generate corrected image data CDAT by multiplying the input image data IDAT for the logo region LR and the peripheral region PR by the correction gain CGAIN.

At 480, data driver 130 may drive a display panel 110 based on the corrected image data CDAT.

Accordingly, in a method of operating a display device 100 according to embodiments, degradation and afterimage effects in the logo region LR may be reduced. Also, a grayscale banding phenomenon may be prevented from occurring in the logo region LR and peripheral region PR.

Figure 10:
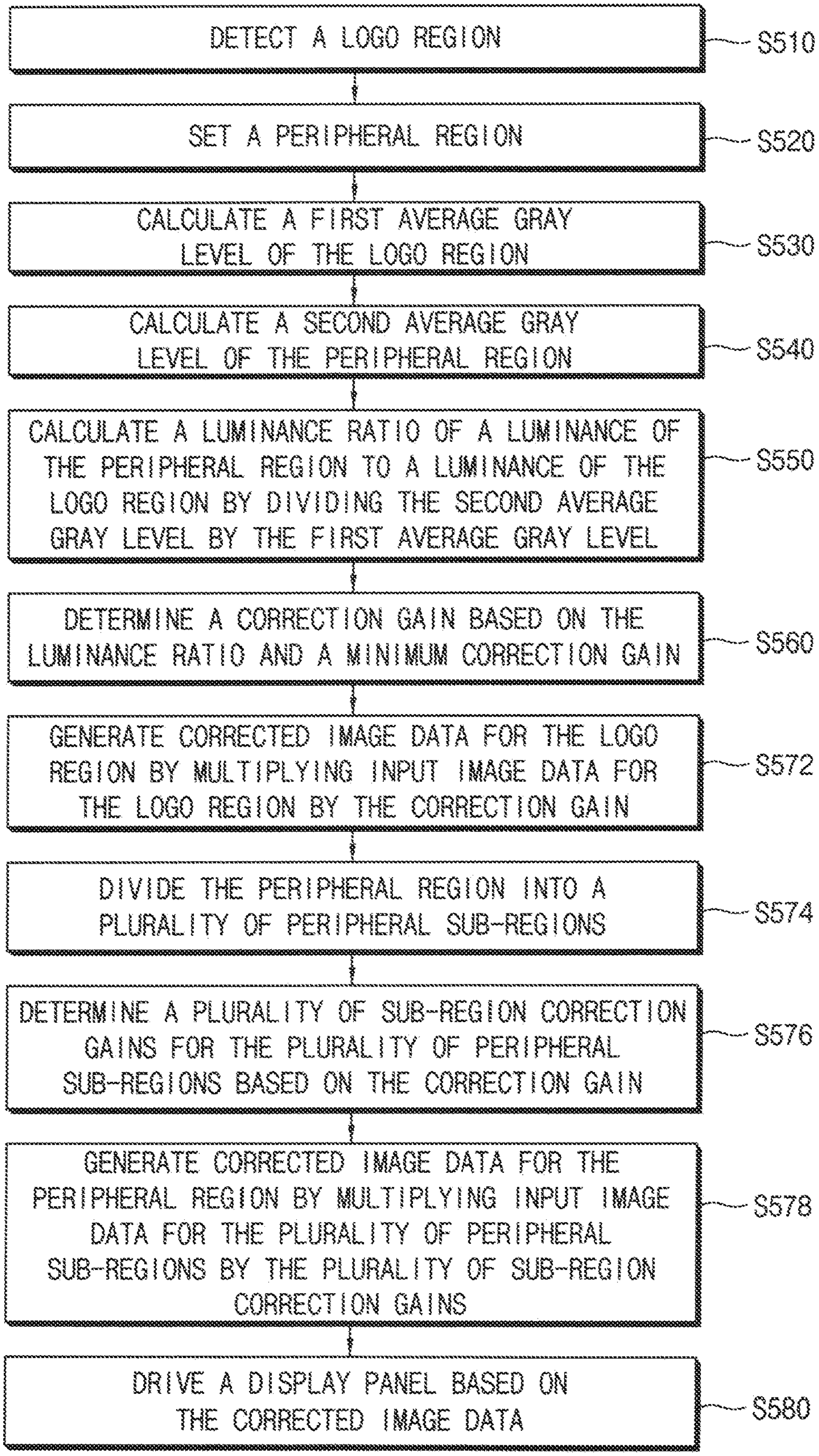
FIG. 10 illustrates an embodiment of a method of operating a display device.
Figure 11:
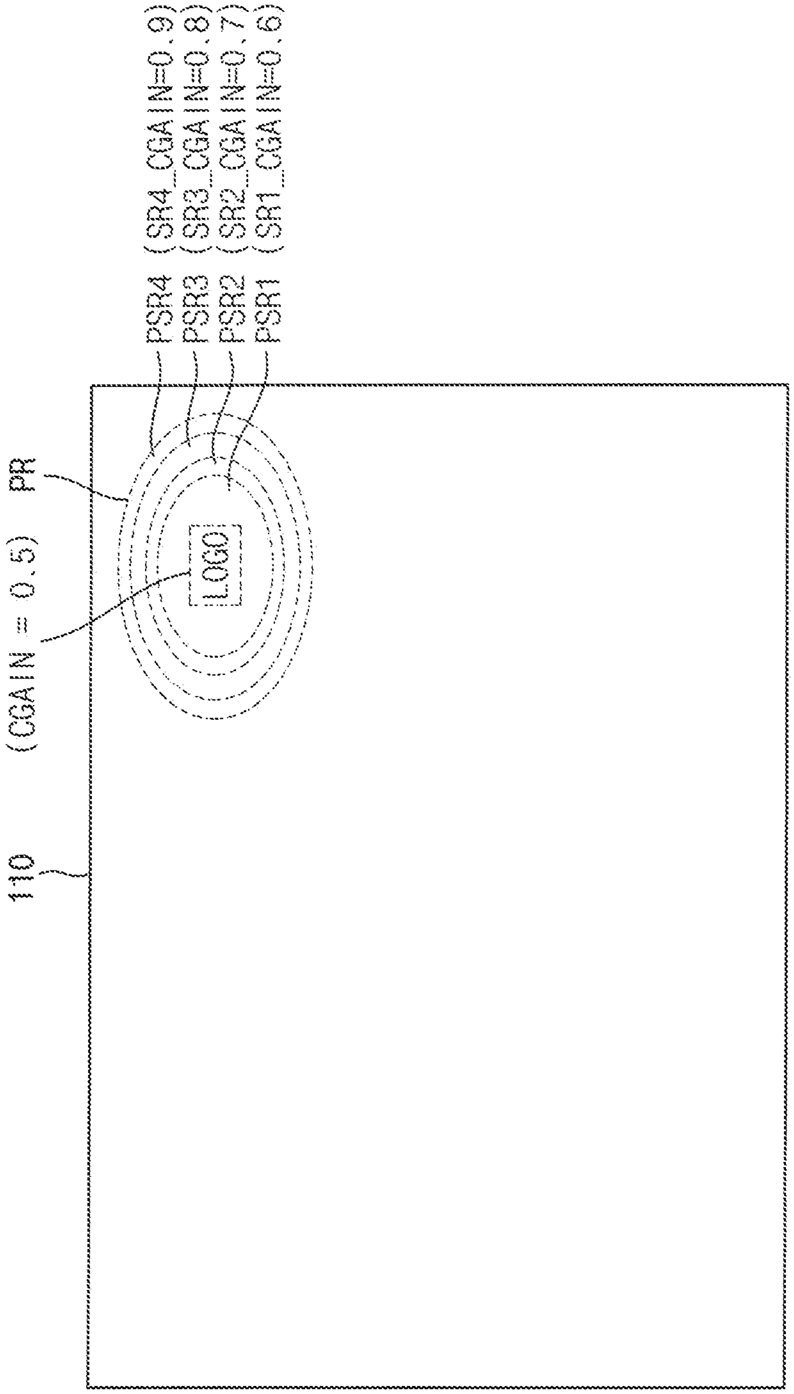
FIG. 11 illustrates an example of correction gains for peripheral sub-regions.
Figure 12:
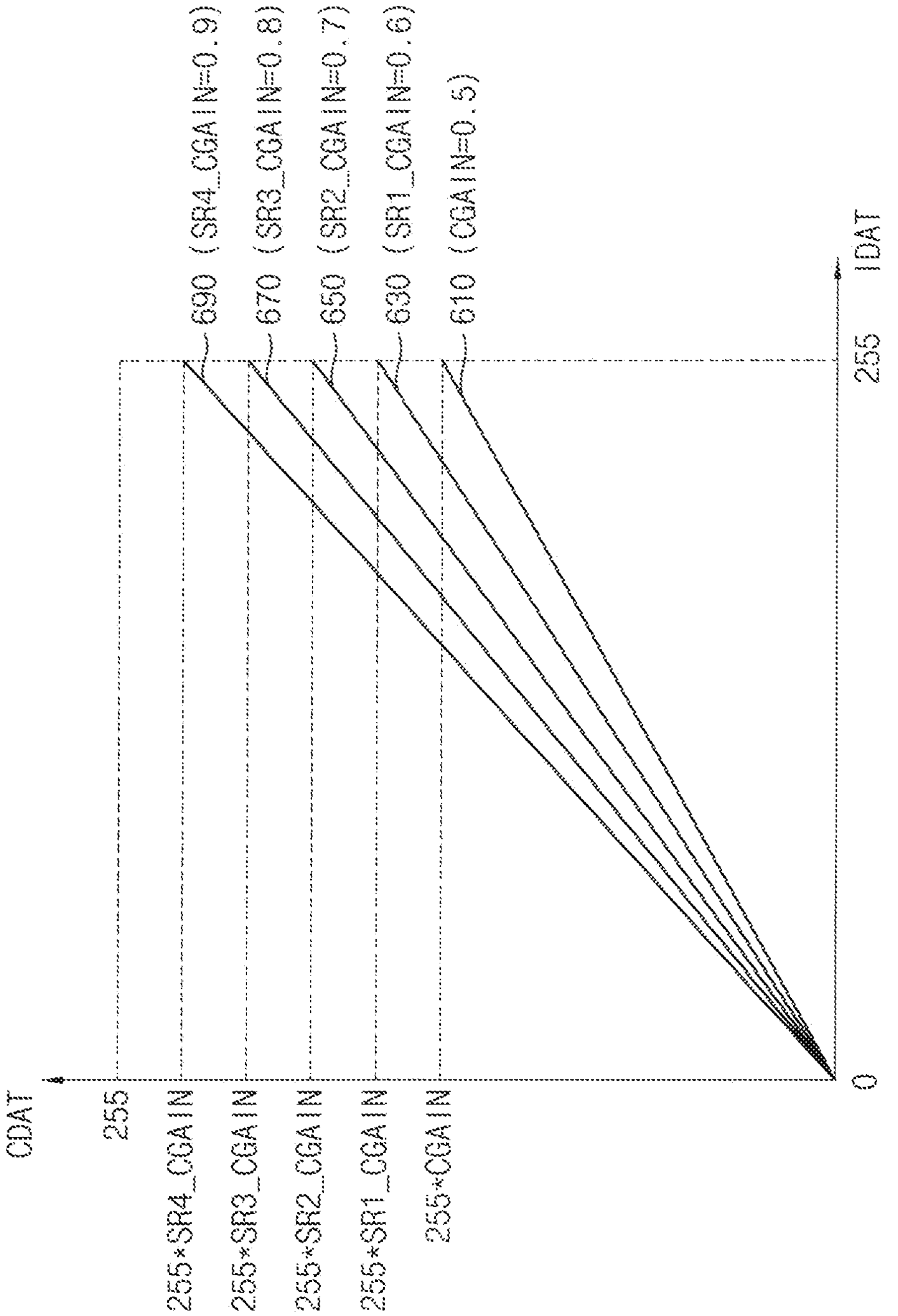
FIG. 12 illustrates an example of corrected image data.

FIG. 10 is a flowchart illustrating an embodiment of a method of operating a display device. FIG. 11 is a diagram for describing an example of a plurality of peripheral sub-regions into which a peripheral region may be divided and a plurality of sub-region correction gains for respective ones of the plurality of peripheral sub-regions. FIG. 12 is a diagram for describing an example of corrected image data generated by correcting input image data based on a correction gain and a plurality of sub-region correction gains.

The method of FIG. 10 may be similar to a method of FIG. 4, except that a plurality of sub-region correction gains, that gradually increase with distance away from a logo region, may be applied to a plurality of peripheral sub-regions of a peripheral region.

Referring to FIGS. 1, 2 and 10, the method includes, at S510, logo region detecting block 150 detecting a logo region LR including a logo based on an analysis of image data IDAT.

At S520, peripheral region setting block 160 may set a peripheral region PR adjacent to the logo region LR.

At S530, correction gain determining block 170 may calculate a first average gray level of the logo region LR.

At S540, correction gain determining block 170 may calculate a second average gray level of the peripheral region PR.

At S550, correction gain determining block 170 may calculate a luminance ratio (of a luminance of the peripheral region PR to a luminance of the logo region LR) by dividing the second average gray level of the peripheral region PR by the first average gray level of the logo region LR.

At S560, correction gain determining block 170 and may determine a correction gain CGAIN to be greater than or equal to the minimum correction gain and is less than or equal to 1. The correction gain determining block 170 may determine the correction gain CGAIN to be within this range based on the luminance ratio and a minimum correction gain At S572, data correcting block 180 may generate corrected image data CDAT for the logo region LR by multiplying the input image data IDAT for the logo region LR by the correction gain CGAIN.

At 574, to generate the corrected image data CDAT for the peripheral region PR, data correcting block 180 may divide the peripheral region PR into a plurality of peripheral sub-regions (S574).

At S576, data correcting block 180 may determine a plurality of sub-region correction gains for respective ones of the plurality of peripheral sub-regions, so that the sub-region correction gains are greater than the correction gain CGAIN and less than 1.

At S578, data correcting block 180 may multiply the input image data IDAT for the plurality of peripheral sub-regions by the plurality of sub-region correction gains, respectively.

For example, as illustrated in FIG. 11, the data correcting block 180 may divide the peripheral region PR having an elliptical shape into a plurality of peripheral sub-regions PSR1, PSR2, PSR3 and PSR4 having ring shapes that surround the logo region LR. In the example of FIG. 11, the plurality of peripheral sub-regions PSR1, PSR2, PSR3 and PSR4 may include, but is not limited to, a first peripheral sub-region PSR1 close to the logo region LR, a second peripheral sub-region PSR2 that is more distant from the logo region LR compared with the first peripheral sub-region PSR1, a third peripheral sub-region PSR3 that is more distant from the logo region LR compared with the second peripheral sub-region PSR2, and a fourth peripheral sub-region PSR4 that is most distant from the logo region LR.

In some embodiments, as illustrated in FIGS. 11 and 12, the plurality of sub-region correction gains SR1_CGAIN, SR2_CGAIN, SR3_CGAIN and SR4_CGAIN may be determined to be proportional (e.g., linearly proportional) to distances of the plurality of peripheral sub-regions PSR1, PSR2, PSR3 and PSR4 relative to the logo region LR. For example, as illustrated in FIG. 11, in a case where the correction gain CGAIN is determined as about 0.5, a first sub-region correction gain SR1_CGAIN for the first peripheral sub-region PSR1 may be determined as about 0.6, a second sub-region correction gain SR2_CGAIN for the second peripheral sub-region PSR2 may be determined as about 0.7, a third sub-region correction gain SR3_CGAIN for the third peripheral sub-region PSR3 may be determined as about 0.8, and a fourth sub-region correction gain SR4_CGAIN for the fourth peripheral sub-region PSR4 may be determined as about 0.9.

In this case, the following conversions may be performed: the input image data IDAT representing a 0-gray level to a 255-gray level may be converted to the corrected image data CDAT representing the 0-gray level to a 255-gray level 255*CGAIN multiplied by the correction gain CGAIN of about 0.5 with respect to the logo region LR as illustrated by curve 610 in FIG. 12, may be converted to the corrected image data CDAT representing the 0-gray level to a 255-gray level 255*SR1_CGAIN multiplied by the first sub-region correction gain SR1_CGAIN of about 0.6 with respect to the first peripheral sub-region PSR1 as illustrated by curve 630 in FIG. 12, may be converted to the corrected image data CDAT representing the 0-gray level to a 255-gray level 255*SR2_CGAIN multiplied by the second sub-region correction gain SR2_CGAIN of about 0.7 with respect to the second peripheral sub-region PSR2 as illustrated by curve 650 in FIG. 12, may be converted to the corrected image data CDAT representing the 0-gray level to a 255-gray level 255*SR3_CGAIN multiplied by the third sub-region correction gain SR3_CGAIN of about 0.8 with respect to the third peripheral sub-region PSR3 as illustrated by curve 670 in FIG. 12, and may be converted to the corrected image data CDAT representing the 0-gray level to a 255-gray level 255*SR5_CGAIN multiplied by the fourth sub-region correction gain SR4_CGAIN of about 0.9 with respect to fourth peripheral sub-region PSR4 as illustrated by curve 690 in FIG. 12.

At S580, data driver 130 may drive a display panel 110 based on the corrected image data CDAT. Since the first sub-region correction gain SR1_CGAIN for the first peripheral sub-region PSR1 close to the logo region LR is close to the correction gain CGAIN, and the fourth sub-region correction gain SR4_CGAIN for the fourth peripheral sub-region PSR4 distant from the logo region LR is close to 1, the decreasing amount of the corrected image data CDAT from the input image data IDAT for the fourth peripheral sub-region PSR4 (which is distant from the logo region LR) may be less than the decreasing amount of the corrected image data CDAT from the input image data IDAT for the first peripheral sub-region PSR1 (which is close to the logo region LR). Thus, the luminance difference between the peripheral region PR and a region outside (or surrounding) the peripheral region PR may be reduced. Also, degradation and an afterimage in the logo region LR may be reduced, and a grayscale banding phenomenon in the logo region LR and peripheral region PR may be prevented.

Figure 13:
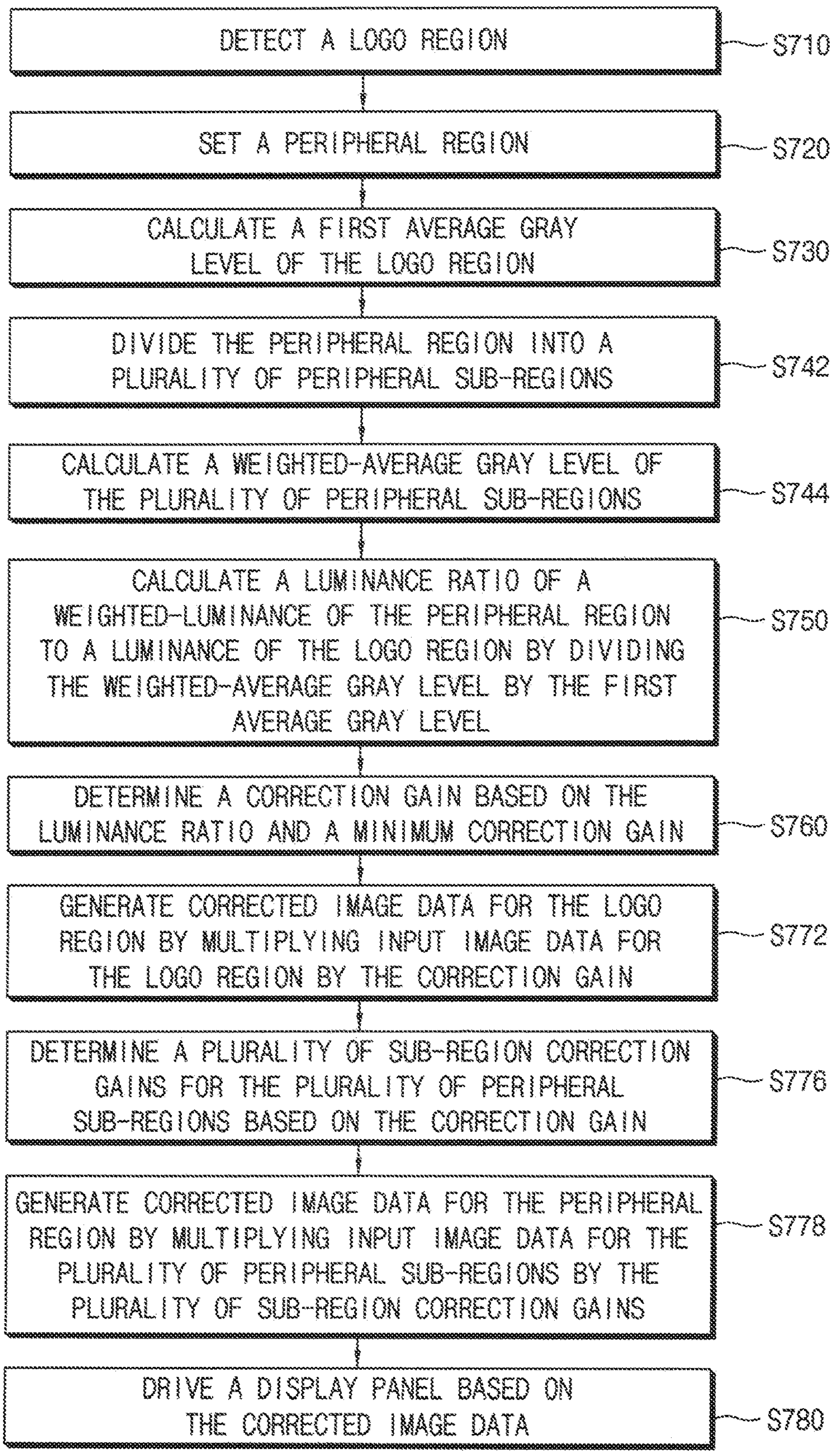
FIG. 13 illustrates an embodiment of a method of operating a display device.

FIG. 13 is a flowchart illustrating an embodiment of a method of operating a display device. The method of FIG. 13 may be similar to a method of FIG. 4, except that a second average gray level of a peripheral region may be determined as a weighted-average gray level of a plurality of peripheral sub-regions. Also, a plurality of sub-region correction gains (that gradually increases with distance from a logo region) may be applied to the plurality of peripheral sub-regions.

Referring to FIGS. 1, 2 and 13, the method includes, at S710, logo region detecting block 150 detecting a logo region LR including a logo by analyzing input image data IDAT.

At S720, peripheral region setting block 160 may set a peripheral region PR adjacent to the logo region.

At S730, correction gain determining block 170 may calculate a first average gray level of the logo region LR.

At S742, correction gain determining block 170 may divide the peripheral region PR into a plurality of peripheral sub-regions.

At S744, correction gain determining block 170 may calculate a weighted-average gray level of the plurality of peripheral sub-regions with weights that decrease with increasing distance of the plurality of peripheral sub-regions to the logo region LR (S744).

At S750, correction gain determining block 170 may calculate a luminance ratio (of a weighted-luminance of the peripheral region PR to a luminance of the logo region LR) by dividing the weighted-average gray level of the plurality of peripheral sub-regions by the first average gray level of the logo region LR.

At S760, correction gain determining block 170 may determine a correction gain CGAIN to be greater than or equal to the minimum correction gain and less than or equal to 1. The correction gain CGAIN may be determined based on the luminance ratio and a minimum correction gain Since relatively high weights are applied to the peripheral sub-region(s) closer to the logo region LR and relatively low weights are applied to peripheral sub-region(s) more distant from the logo region LR, the correction gain CGAIN may produce a more pronounced effect for a peripheral image close to the logo.

At S772, data correcting block 180 may generate corrected image data CDAT for the logo region LR by multiplying the input image data IDAT for the logo region LR by the correction gain CGAIN.

At S776, to generate the corrected image data CDAT for the peripheral region PR, data correcting block 180 may divide the peripheral region PR into a plurality of peripheral sub-regions (e.g., substantially the same as the plurality of peripheral sub-regions determined by correction gain determining block 170) and may determine a plurality of sub-region correction gains for the plurality of peripheral sub-regions, with the plurality of sub-region correction gains being greater than the correction gain CGAIN and less than 1.

At S778, data correcting block 180 may multiply the input image data IDAT for the plurality of peripheral sub-regions by the plurality of sub-region correction gains, respectively.

At S780, data driver 130 may drive a display panel 110 based on the corrected image data CDAT. Since the sub-region correction gain for the peripheral sub-region close to the logo region LR is close to the correction gain CGAIN and the sub-region correction gain for the peripheral sub-region distant from the logo region LR is close to 1, the decreasing amount of the corrected image data CDAT from the input image data IDAT for the peripheral sub-region distant from the logo region LR may be less than the decreasing amount of the corrected image data CDAT from the input image data IDAT for the peripheral sub-region close to the logo region LR. Thus, the luminance difference between the peripheral region PR and a region outside (or surrounding) the peripheral region PR may be reduced. Further, degradation and afterimage effects in the logo region LR may be reduced, and a grayscale banding phenomenon in the logo region LR and the peripheral region PR may be prevented.

Figure 14:
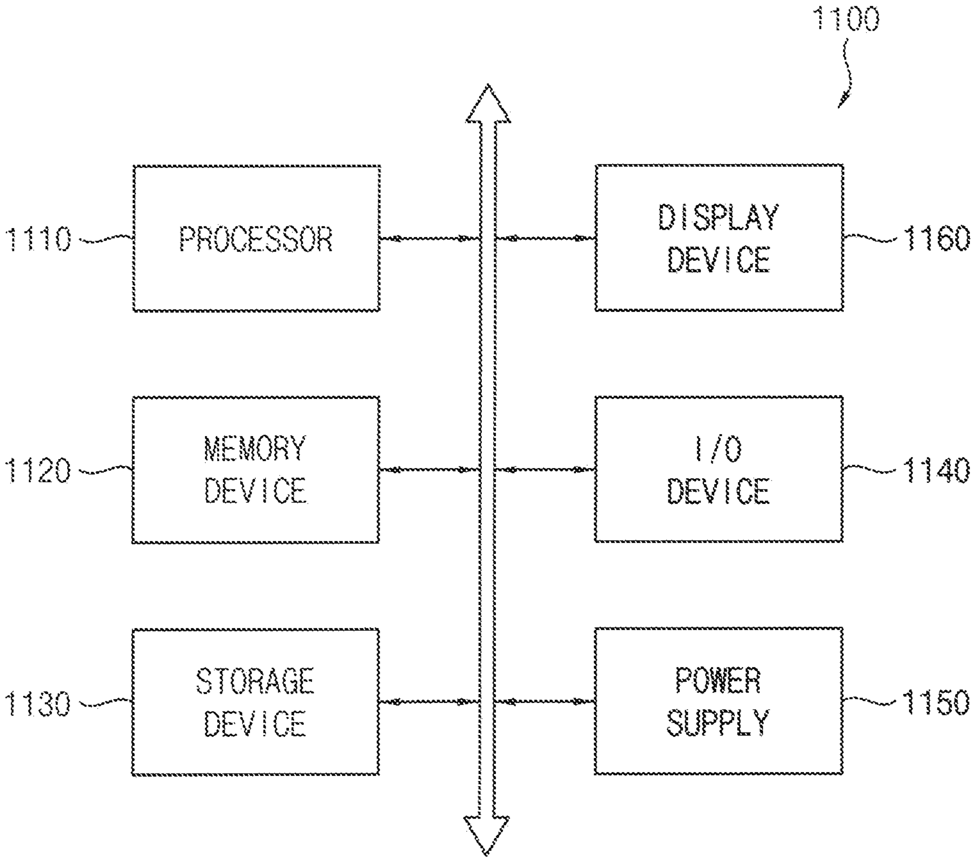
FIG. 14 illustrates an embodiment of an electronic device including a display device.

FIG. 14 is a block diagram illustrating an embodiment of an electronic device 1100, which may include a processor 1110, a memory device 1120, a storage device 1130, an input/output (I/O) device 1140, a power supply 1150, and a display device 1160. The electronic device 1100 may also include a plurality of ports for communicating a video card, a sound card, a memory card, a universal serial bus (USB) device, and/or other devices.

The processor 1110 may perform various computing functions or tasks. The processor 1110 may be, for example, an application processor (AP), a microprocessor, or a central processing unit (CPU). The processor 1110 may be coupled to one or more other components, for example, via an address bus, a control bus, a data bus, etc. In some embodiments, the processor 1110 may be coupled to an extended bus, e.g., a peripheral component interconnection (PCI) bus.

The memory device 1120 may store data for operations of the electronic device 1100 and may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, and a mobile dynamic random access memory (mobile DRAM) device.

The storage device 1130 may be a solid state drive (SSD) device, a hard disk drive (HDD) device, a CD-ROM device, or another type of storage device. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components through the buses or other communication links.

In the display device 1160, a logo region may be detected, a correction gain may be determined based on a first average gray level of the logo region and a second average gray level of a peripheral region adjacent to the logo region, corrected image data may be generated by correcting input image data based on the correction gain, and a display panel may be driven based on the corrected image data. Accordingly, degradation and an afterimage effect in the logo region may be reduced. Also, grayscale banding in the logo region and the peripheral region may be prevented.

The inventive concepts according to one or more embodiments may be applied to any type of electronic device 1100 including display device 1160. Examples include a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, blocks, modules, units, multiplexers, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, devices, blocks, modules, units, multiplexers, logic, interfaces, decoders, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, blocks, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An electronic device comprising:

a processor configured to provide image data; and a display device configured to display an image based on the image data, the display device comprising:

a display panel including a plurality of pixels;

a controller configured to receive the image data including data representing a logo, detect a logo region including the logo in the image data, set a peripheral region adjacent to the logo region based on one or more parameters corresponding to a shape of the peripheral region, determine a correction gain based on a quotient of a second gray level of the peripheral region adjacent to the logo region and a first gray level of the logo region, and generate corrected image data by correcting the image data based on the correction gain; and a data driver configured to provide data signals to the plurality of pixels based on the corrected image data, wherein the controller determines a luminance ratio of a luminance of the peripheral region to a luminance of the logo region based on the quotient of the second gray level and the first gray level, and determines the correction gain based on the luminance ratio.

2. The electronic device of claim 1, wherein the first gray level is an average of gray levels for the plurality of pixels in the logo region, and the second gray level is an average of gray levels for the plurality of pixels in the peripheral region.

3. The electronic device of claim 1, wherein the controller is configured to generate the corrected image data based on a product of the image data and the correction gain, and one or more gray levels of the corrected image data are linearly proportional to one or more gray levels of the image data.

4. An electronic device comprising:

a processor configured to provide image data; and a display device configured to display an image based on the image data, the display device comprising:

a display panel including a plurality of pixels;

a controller configured to receive the image data including data representing a logo, detect a logo region including the logo in the image data, set a peripheral region adjacent to the logo region, determine a correction gain based on a quotient of a second gray level of the peripheral region adjacent to the logo region and a first gray level of the logo region, and generate corrected image data by correcting the image data based on the correction gain;

a data driver configured to provide data signals to the plurality of pixels based on the corrected image data;

a first circuit configured to detect the logo region in an image represented by the image data;

a second circuit configured to set the peripheral region adjacent the logo region;

a third circuit configured to determine the correction gain based on the first gray level of the logo region and the second gray level of the peripheral region; and a fourth circuit configured to correct the image data for the logo region and the peripheral region based on the correction gain.

5. The electronic device of claim 4, wherein the first circuit is configured to:

detect at least two of a high gray level region, a still region, or an edge region in the image represented by the image data; and detect the logo region as a region in which the at least two of the high gray region, the still region and the edge region overlap, wherein the high gray level region is a region with gray level pixel values above a predetermined level.

6. The electronic device of claim 4, wherein the second circuit is configured to set a region surrounding the logo region, and the region surrounding the logo region has a substantially rectangular shape or a substantially elliptical shape as the peripheral region.

7. The electronic device of claim 4, wherein the third circuit is configured to:

calculate the first gray level of the logo region;

calculate the second gray level of the peripheral region;

calculate a luminance ratio of a luminance of the peripheral region to a luminance of the logo region, the luminance ratio based on a quotient of the second gray level and the first gray level; and determine the correction gain based on the luminance ratio and a predetermined correction gain, the correction gain being greater than or equal to the predetermined correction gain and less than or equal to 1.

8. The electronic device of claim 4, wherein the third circuit is configured to:

calculate a luminance ratio based on equation (1), the luminance ratio being a luminance of the peripheral region to a luminance of the logo region; and $$\text{LUM\_RATIO}=\text{AVG\_PERI}/\text{AVG\_LOGO} \quad (1)$$

calculate the correction gain based on equation (2), $$\text{CGAIN}=\text{LUM\_RATIO}*(1-\text{GAIN\_LIMIT})+\text{GAIN\_LIMIT}'' \quad (2)$$

where LUM_RATIO represents the luminance ratio, AVG_PERI represents the second gray level of the peripheral region, AVG_LOGO represents the first gray level of the logo region, CGAIN represents the correction gain, and GAIN_LIMIT represents a predetermined correction gain.

9. The electronic device of claim 4, wherein the third circuit is configured to:

calculate the first gray level of the logo region;

divide the peripheral region into a plurality of peripheral sub-regions;

calculate, as the second gray level of the peripheral region, a weighted-average gray level of the plurality of peripheral sub-regions based on one or more weights that decrease with increasing distance of the plurality of peripheral sub-regions relative to the logo region;

calculate a luminance ratio of a weighted-luminance of the peripheral region to a luminance of the logo region, the luminance ratio based on a quotient of the weighted-average gray level by the first gray level; and determine the correction gain based on the luminance ratio and a predetermined correction gain, the correction gain being greater than or equal to the predetermined correction gain and is less than or equal to 1.

10. The electronic device of claim 4, wherein the fourth circuit is configured to generate the corrected image data based on a product of the correction gain and the image data for the logo region and the peripheral region.

11. The electronic device of claim 4, wherein the fourth circuit is configured to:

generate the corrected image data for the logo region based on a product of image data for the logo region and the correction gain;

divide the peripheral region into a plurality of peripheral sub-regions;

determine a plurality of sub-region correction gains for the plurality of peripheral sub-regions, the plurality of sub-region correction gains being greater than the correction gain and less than 1; and generate the corrected image data for the peripheral region based on a product of the image data for the plurality of peripheral sub-regions and the plurality of sub-region correction gains.

12. The electronic device of claim 11, wherein the fourth circuit is configured to:

determine the plurality of sub-region correction gains for the plurality of peripheral sub-regions, the plurality of sub-region correction gains for the plurality of peripheral sub-regions being linearly proportional to distances of the plurality of peripheral sub-regions to the logo region.

13. A method of operating a display device, the method comprising:

detecting a logo region including a logo in image data;

setting a peripheral region adjacent to the logo region based on one or more parameters corresponding to a shape of the peripheral region;

determining a correction gain based on a quotient of a second gray level of the peripheral region adjacent to the logo region and a first gray level of the logo region, wherein the quotient is determined by dividing the second gray level by the first gray level;

generating corrected image data by correcting the image data based on the correction gain; and driving a display panel based on the corrected image data, wherein a luminance ratio of a luminance of the peripheral region to a luminance of the logo region is determined based on the quotient of the second gray level and the first gray level, and the correction gain is determined based on the luminance ratio.

14. The method of claim 13, wherein a gray level of the corrected image data is linearly proportional to a gray level of the image data.

15. The method of claim 13, wherein determining the correction gain includes:

calculating the first gray level of the logo region;

calculating the second gray level of the peripheral region;

calculating the luminance ratio of the luminance of the peripheral region to the luminance of the logo region, the luminance ratio based on the quotient of the second gray level and the first gray level; and determining the correction gain based on the luminance ratio and a predetermined correction gain, the correction gain being greater than or equal to the predetermined correction gain and less than or equal to 1.

16. The method of claim 13, wherein determining the correction gain includes:

calculating the luminance ratio of the luminance of the peripheral region to the luminance of the logo region based on equation (1); and $$LUM\_RATIO=AVG\_PERI/AVG\_LOGO \quad (1)$$

calculating the correction gain based on equation (2), $$CGAIN=LUM\_RATIO*(1-GAIN\_LIMIT)+GAIN\_LIMIT \quad (2)$$

where LUM_RATIO represents the luminance ratio, AVG_PERI represents the second gray level of the peripheral region, AVG_LOGO represents the first gray level of the logo region, CGAIN represents the correction gain, and GAIN_LIMIT represents a predetermined correction gain.

17. The method of claim 13, wherein determining the correction gain includes:

calculating the first gray level of the logo region;

dividing the peripheral region into a plurality of peripheral sub-regions;

calculating, as the second gray level of the peripheral region, a weighted-average gray level of the plurality of peripheral sub-regions based on one or more weights that decrease with increasing distance of the plurality of peripheral sub-regions relative to the logo region;

calculating a luminance ratio of a weighted-luminance of the peripheral region to the luminance of the logo region, the luminance ratio based on a quotient of the weighted-average gray level and the first gray level; and determining the correction gain based on the luminance ratio and a predetermined correction gain, the correction gain being greater than or equal to the predetermined correction gain and less than or equal to 1.

18. The method of claim 13, wherein generating the corrected image data includes generating the corrected image data based on a product of the correction gain and the image data for the logo region and the peripheral region.

19. The method of claim 13, wherein generating the corrected image data includes:

generating the corrected image data for the logo region based on a product of the image data for the logo region and the correction gain;

dividing the peripheral region into a plurality of peripheral sub-regions;

determining a plurality of sub-region correction gains for the plurality of peripheral sub-regions, the plurality of sub-region correction gains being greater than the correction gain and less than 1; and generating the corrected image data for the peripheral region based on a product of the image data for the plurality of peripheral sub-regions and the plurality of sub-region correction gains.

20. The method of claim 19, wherein the plurality of sub-region correction gains for the plurality of peripheral sub-regions is linearly proportional to distances of the plurality of peripheral sub-regions relative to the logo region.

* * * * *